United States Patent [19]

Schiele et al.

[11] Patent Number: 4,544,403
[45] Date of Patent: Oct. 1, 1985

[54] HIGH CHARGE, LOW LEAKAGE TANTALUM POWDERS

[75] Inventors: Edward K. Schiele, Gurnee, Ill.; Robert V. Manley, Jr., Muskogee; Carlos F. Rerat, Fort Gibson, both of Okla.

[73] Assignee: Fansteel Inc., North Chicago, Ill.

[21] Appl. No.: 676,666

[22] Filed: Nov. 30, 1984

[51] Int. Cl.⁴ .............................................. B22F 9/00
[52] U.S. Cl. .............................. 75/0.5 AB; 75/0.5 BB; 75/251
[58] Field of Search ............... 75/0.5 AB, 0.5 BB, 251

[56] References Cited

U.S. PATENT DOCUMENTS

| | | | |
|---|---|---|---|
| 3,295,951 | 1/1967 | Fincham et al. | 75/0.5 BB |
| 3,748,106 | 7/1973 | Davis et al. | 75/0.5 BB |
| 3,829,310 | 8/1974 | Mahy | 75/0.5 BB |
| 4,149,876 | 4/1979 | Rerat | 75/0.5 BB |
| 4,356,028 | 10/1982 | Bates | 75/0.5 BB |

Primary Examiner—Wayland Stallard
Attorney, Agent, or Firm—Barnes, Kisselle, Raisch, Choate, Whittemore & Hulbert

[57] ABSTRACT

Tantalum powders for electrolytic capacitors having improved electrical capacity and low direct current leakage characteristics are produced by the introduction of combinations of carbon, nitrogen and sulfur-containing materials.

25 Claims, 5 Drawing Figures

HIGH CHARGE, LOW LEAKAGE TANTALUM POWDERS

FIELD OF INVENTION

This invention relates to tantalum powders, particularly to tantalum powders which can be fabricated into anodes for electrolytic capacitors having improved electrical capacity and low leakage characteristics.

BACKGROUND OF THE INVENTION

Use of tantalum powders for the preparation of anodes in electrolytic capacitors is generally well known. Such anodes (electrodes) are produced by compacting the tantalum powder to provide a coherent shape, sintering the compact, and subsequently forming a continuous dielectric oxide film on the sintered product. In such capacitors, it is generally desirable to have as high a specific charge or capacity (CV/g or $\mu$fv/g) as possible. U.S. Pat. No. 3,418,106 discloses an agglomerated tantalum powder crushable as tantalum which, when fabricated into an electrode, provides enhanced specific capacity in pressed and sintered anodes. U.S. Pat. No. 3,843,360 discloses an improved tantalum powder in which the relationship between the average particle diameter of the powder and its bulk density has been limited to a specific range. In U.S. Pat. No. 4,347,084, an electrode having a specific capacity in excess of 10,000 $\mu$fv/g is prepared by sintering a tantalum powder having a grain size finer than 2.5 $\mu$m.

Another approach toward achieving improved specific capacity in tantalum powders for electrolytic capacitors is to modify the particle shape and morphology. In U.S. Pat. No. 3,647,415, a tantalum powder for electrolytic capacitors is disclosed wherein the tantalum particles have an average flakiness of 2 to 60, at least 80 percent by weight of the powder consisting of particles having a shorter breadth of 3 to 250 $\mu$m and being free from particles having a shorter breadth of about 500 $\mu$m.

Additives (or dopants) to the tantalum powder have been proposed to provide (or help retain) higher specific capacity than the undoped powder. U.S. Pat. No. 4,009,007 discloses a tantalum powder capable of producing anodes of improved electrical capacity which is prepared by the addition of phosphorous-containing materials in amounts from about 5 to about 400 ppm based on elemental phosphorus. Such phosphorous-containing additives can be made to the powder itself, as in the above U.S. Pat. No. 4,009,007; or the dopant can be added, as described in U.S. Pat. No. 4,356,028, during the method of preparing tantalum powder from a tantalum-rich solution in an organic solvent in which a tantalum salt is precipitated from the tantalum rich solvent and the tantalum salt is reduced to metallic tantalum by an alkali metal, wherein a phosphorous-containing material is added in either the precipitation step or the reduction step, or both, and in which the final tantalum powder contains from about 2 to 400 ppm phosphorous on a tantalum metal basis. U.S. Pat. No. 4,379,128 discloses that alkali tantalum fluoride salts, having improved properties as a source for tantalum metal powder, may be produced by the introduction of a phosphorous-doping agent to the salt during its preparation.

German Publication No. DE 3140248A1 describes a process for the manufacture of a porous metal (tantalum and/or niobium) powder doped with boron or boron compounds for electrolytic capacitors having lower relative leakage and higher specific capacity. This publication states that the doping with boron or boron compounds, in quantities up to 0.5 weight percent based on the metal content, can be carried out during the manufacture of the powder, or be added to the green porous metal anodes.

In U.S. Pat. No. 3,825,802, particles of tantalum constituting a porous electrode were doped with a dopant selected from the group consisting of nitrogen, silicon, boron and mixtures thereof. For nitrogen, the dopant ranges from 0.47 to 2.71 atomic percent (or 0.5 to 3.0% TaN added).

U.S. Pat. No. 4,154,609 describes a method of producing a porous sintered metal body which comprises molding under pressure metal powder to form a molded body and then sintering the molded body, with the metal being selected from the group consisting of Groups IVB, VB, and VIB of the Periodic Table. Prior to the molding step, the metal powder is admixed with about 0.01 to about 10% by weight of at least one inorganic lubricant selected from sulfides, selenides and tellurides of a member of sub-groups V and VI of the Periodic Table, whereby the sintered metal body still contains 2% to 70% by weight of the inorganic lubricant. U.S. Pat. No. 4,229,217 discloses a method of producing a porous sintered metal body which comprises the steps of molding metal powder under pressure to form a molded body and then sintering the molded body, with the metal powder being selected from the group consisting of Groups IVB, VB, and VIB of the Periodic Table. Prior to the molding step, the metal powder is mixed with about 0.01 to about 10% by weight of at least one inorganic lubricant selected from nitrides of boron and silicon, whereby the sintered metal bodies still contains 2% to 70% by weight of the inorganic lubricant.

The oxygen concentration of tantalum powder destined to be used in making electrolytic capacitors is important, according to the discussion in U.S. Pat. No. 4,423,004. It is stated that, when the total oxygen content of porous tantalum pellets is above approximately 4000 ppm, capacitors using such pellets as electrodes have unsatisfactory life characteristics. Tantalum powder has a great affinity for oxygen, and the powder particles readily oxidize upon exposure to air, particularly after a thermal treatment step.

SUMMARY OF THE INVENTION

In accordance with the present invention, a tantalum powder capable of producing capacitors of improved specific capacity in combination with relatively low leakage is prepared by the addition of selected materials providing at least two elements selected from carbon, nitrogen and sulfur. These additions herein are referred to as C+N, C+S, N+S, and C+N+S additions. Preferably, the range of addition for the C+N+S-containing materials extends from about 100 to 10,000 ppm contained C+N+S content on a tantalum metal weight basis. The most preferred addition of C+N+S-containing materials is in the range from about 150 to 3,000 ppm contained C+N+S. In one preferred embodiment, along with (in addition to) the C+N+S-containing additive, an addition of a phosphorous-containing material is made: either to the tantalum powder in an amount from about 5 to 400 ppm phosphorus based on elemental phosphorus as described in U.S. Pat. No.

4,009,007; or during the method of preparing the tantalum powder in an amount so that 2 to 400 ppm phosphorus based on elemental phosphorus is retained in the final tantalum powder as described in U.S. Pat. No. 4,356,028.

DESCRIPTION OF THE DRAWINGS

The present invention will be more readily understood from the drawings taken in conjunction with the detailed description and examples.

DETAILED DESCRIPTION

Figure 1:
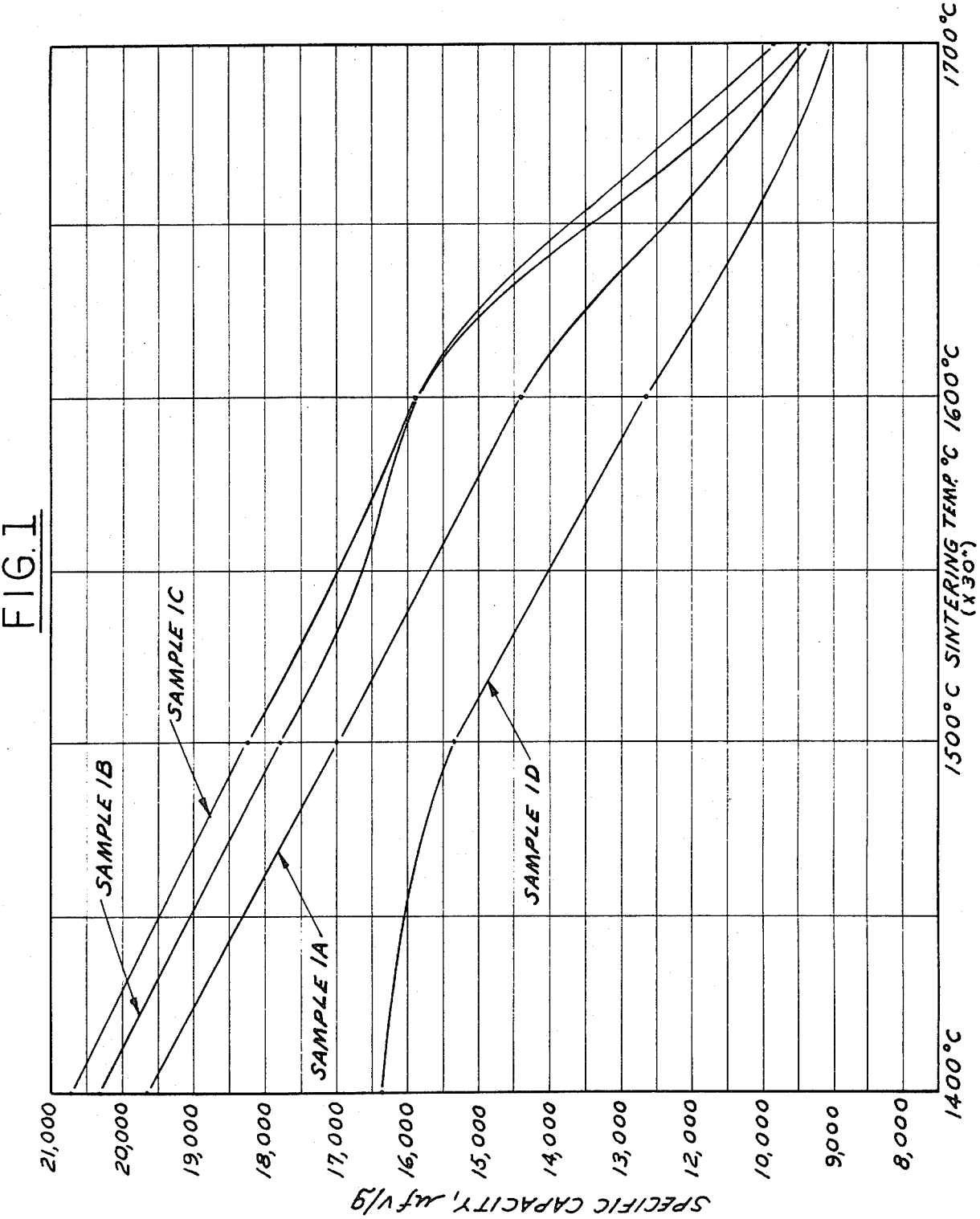
FIG. 1 is a graph of specific charge or capacity as a function of sintering temperature for anodes produced from tantalum powders containing various amounts of thiocyanate additive.

Potassium thiocyanate (KCNS) has been found to be a preferred additive or dopant for a combined C+N+S additive when it is desired to add all or a portion of these three elements to the tantalum powder in equal mole ratios. Other alkali metal thiocyanate salts, as well as ammonium thiocyanate and other inorganic thiocyanates, can also be used. Where it is desired to add C+N or C+S or C+N+S, but not necessarily in equal mole ratios, suitable organic compound dopants may be employed. Examples of such organic compounds are thiophene to provide C+S addition, pyrazole to provide C+S, and thiourea, thiocarbonilide or a mixture of pyrazole and thiophene for C+N+S. Inorganic carbides, nitrides and sulfides may be employed for addition of C or N or S alone, or in combination for C+N or C+S, etc.

A preferred method to introduce the carbon, nitrogen and/or sulfur to the tantalum powder in desired quantities is by appropriate gaseous treatments. Thus, a sulfur-containing tantalum powder can be produced by exposing the powder to a sulfur-bearing gas, such as hydrogen sulfide, at an elevated temperature, such as about 700° C., for an appropriate time duration. Similarly, a carbon-containing powder can be produced using methane or other hydrocarbon gas in a similar elevated temperature treatment, and a nitrogen-containing powder can be produced using nitrogen gas. Any two or all three of these elements (C, N and S) can be added simultaneously or successively in a gaseous treatment of the tantalum powder at an elevated temperature using selected C-, N-, and S-containing gases.

A C+N+S-containing material may be added in a dry state to the tantalum powder. If the added material initially is a liquid or solid, it is preferable first to dissolve the additive in a suitable solvent (aqueous, partially aqueous or organic) or to prepare an aqueous or organic slurry or dispersion. The dry additive powder, solution or slurry is then blended with tantalum powder, allowed to dry, and may be further dried at about 50° to 100° in air or in an inert atmosphere. Water, preferably distilled or deionized water, is a suitable carrier or solvent for preparation of an aqueous solution or slurry containing a C+N+S-containing inorganic salt additive. Organic solvents such as acetones, alcohols such s methyl alcohol, amides including N, N-dimethylformamide (DMF), N-methylpyrrolidinone (NMP), and dimethyl sulfoxide also can be selected as a solvent or carrier for C+N+S additives, such as a solution for addition of ammonium thiocyanate, for example.

The preferred materials for phosphorous doping are the inorganic phosphate salts, such as ammonium sodium, potassium, calcium, barium and lead orthophosphates, ammonium mono-hydrogen orthophosphate, ammonium di-hydrogen orthophosphate, sodium mono-hydrogen orthophosphate, sodium di-hydrogen orthophosphate and potassium di-hydrogen orthphosphate. Other suitable phosphorous-containing materials include elemental phosphorus, metallic phosphides, phosphorous oxides and acids, and organic phosphorous-containing materials such as alkyl phosphates. Phosphate materials containing no metallic cations, such as ammonium mono-hydrogen orthophosphate, ammonium di-hydrogen orthophosphate and phosphoric acid, are particularly preferred because they do not introduce extraneous metals into the tantalum powder, with possible adverse effects on the DC leakage and breakdown voltage properties of the anodes resulting therefrom. Suitable processes for phosphorous doping are disclosed in U.S. Pat. Nos. 4,009,007 and 4,356,028, which are assigned to the assignee hereof and incorporated herein by reference.

The improvement of this invention is applicable to tantalum powders produced in different ways, including sodium-reduced tantalum powders and tantalum powders produced from melted ingots (such as electron beam or arc melted). The tantalum powders may, if desired, be in hydride form when the C, N, S and/or phosphorous-containing additives are added, and then reduced to metallic form in a subsequent treatment. The tantalum powder may be unagglomerated at the time of C, N, S and/or phosphorus additions, or may be agglomerated thereafter by the thermal agglomeration method of U.S. Pat. No. 3,473,915, which patent is assigned to the assignee hereof and incorporated herein by reference. Alternatively, the additives can be added to the tantalum powder after a thermal agglomeration treatment.

The maximum increase in specific capacity is obtained when the pressed tantalum anodes made from the powders of this invention are sintered at relatively low sintering temperatures, especially in the range of about 1400° to 1600° C. A lesser increase is obtained for anodes sintered at 1700° C., and still less for anodes sintered at 1800° C. and higher. While not wishing to be bound by theory, it is believed that the C+N+S-containing additive serves or functions as a sintering inhibitor during sintering of the anode. Thus, anodes sintered from a tantalum powder containing a C+N+S additive have a higher surface area, and consequently higher specific capacity, than anodes sintered from the same tantalum powder not containing the additive.

EXAMPLE 1

Example 1 shows the effect of an addition of potassium thiocyanate (KCNS) to a sodium-reduced tantalum powder. Potassium thiocyanate (KCNS) was dissolved in deionized water to achieve essentially a saturated solution. The required amount of this solution was added to and mixed with a 100 g sample of sodium-reduced tantalum powder to achieve an addition of 544 ppm contained total C+N+S content on a tantalum metal weight basis. This treated powder was dried by evaporation at ambient temperature, followed by heating to complete dryness in an air atmosphere at about 90° C.

The powder then was heated in a vacuum of about $10^{-5}$ torr absolute pressure to about 1450° C. (optical temperature), held for one-half hour at temperature, cooled under vacuum for two hours and finally under argon to ambient temperature, then milled and screened using a 35 mesh (U.S. Standard) screen. Any oversize material was remilled and rescreened so that all powder was −35 mesh. This treatment of the tantalum powder is referred to as "thermal agglomeration" according to the teachings of U.S. Pat. No. 3,473,915. This sample was designated 1A.

An additional powder sample, designated 1B, was prepared by the procedure as described for sample 1A, except that the addition of KCNS was increased to provide a total addition of 1088 ppm contained total C+N+S on a tantalum metal weight basis. A further similarly prepared sample 1C provided a total addition of 1632 ppm contained total C+N+S content. Another sample of tantalum powder from the same starting lot as for sample 1A, but which contained no additive, was otherwise prepared by a similar treatment. This undoped sample was designated as sample 1D, and was used as a control for comparison to the doped samples 1A, 1B and 1C.

Portions of each type of powder were pressed into individually weighed 1.005±0.010 g/anode compacts with an embedded tantalum lead wire in a 5.4 mm. diameter die to a green density of 4.5 g/cm³. One group of the anodes of each powder was sintered for 30 minutes at 1400° C. (optical temperature). An additional similar group of anodes was sintered for 30 minutes at 1500° C.; another for 30 minutes at 1600° C.; and still another for 30 minutes at 1700° C. All sintering was performed in a cold-wall, vacuum sintering furnace ($10^{-5}$ torr absolute pressure).

The electrical testing procedure involved anodizing the sintered anodes in 0.1% phosphoric acid in water at an electrolyte temperature of 90° C. Anodizing of the anodes was carried out at a current density of 35 milliamps per gram until 100 volts was reached, and then they were held for two hours at 100 volts. The anodized anodes were washed in deionized water and dried in clean air at 105° C. Direct current leakage (DCL) was then measured at a test voltage of 70 volts in 10% phosphoric acid. The anodes were immersed in the test solution to the top of the anode, and the test voltage was applied for two minutes, after which the DCL was measured. After DCL measurements were completed, the anodes were soaked in 10% phosphoric acid for 30 to 45 minutes. Capacitance was measured with the anode immersed in 10% phosphoric acid employing a type 1611 B General Radio Capacitance Bridge with an a.c. signal of 0.5 volts and a d.c. bias of 3 volts.

Figure 2:
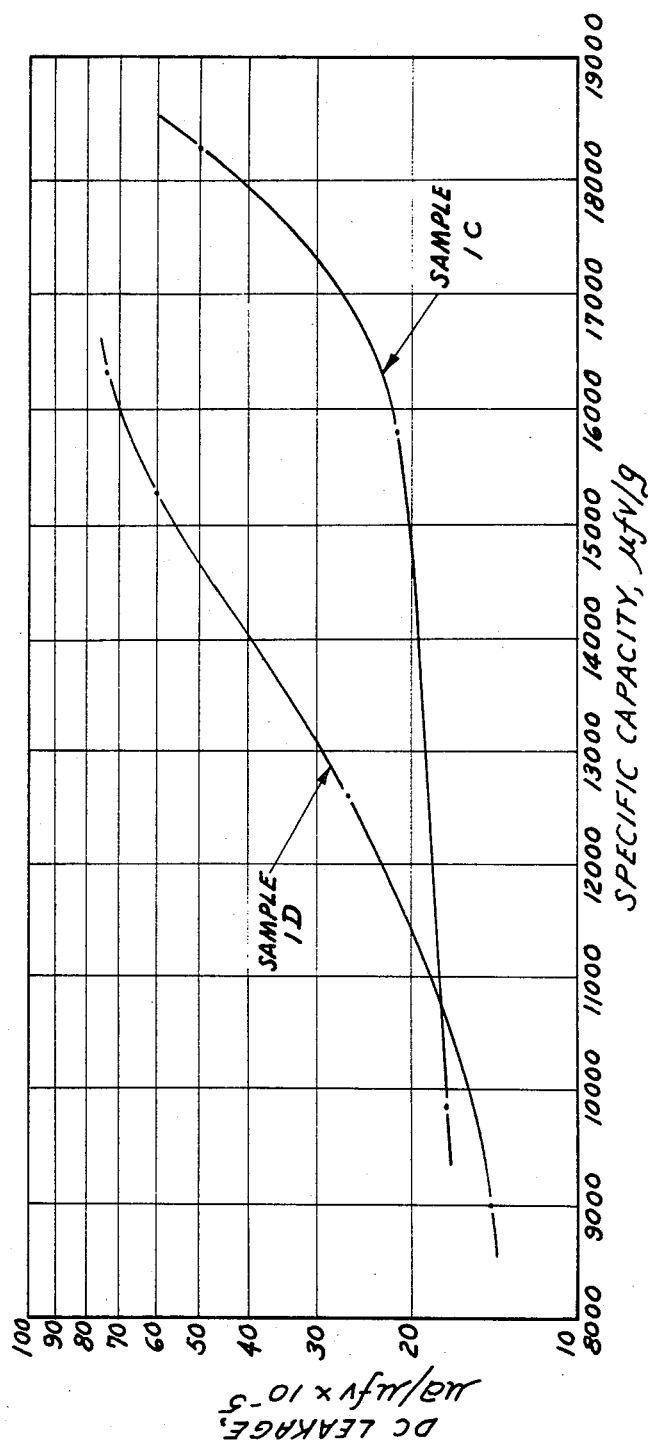
FIG. 2 is a graph of DC leakage per unit charge versus specific charge or capacity for two groups of anodes of FIG. 1. (Note: 1 $\mu$fv = 1$\mu$ coulomb.)

The average values for DCL per unit charge ($\mu a/\mu fv$) and specific capacity (CV/g or $\mu fv/g$) for the various groups of sample 1A–1D anodes are set forth in Table I and illustrated graphically in FIGS. 1 and 2.

TABLE I

Effect of Additions of KCNS on the Electrical Properties of Anodes of Sintered Sodium-Reduced Tantalum Powder

| Sample No. | KCNS Addition, ppm C + N + S | Sintering Condition | | Electrical Properties | |
|---|---|---|---|---|---|
| | | Temp., °C. | Time, Min. | DCL, $10^5$ $\mu a/ufv$ | Specific Capacity, $\mu fv/g$ |
| 1A | 544  | 1400 | 30 | 45.3 | 19,664 |
| 1B | 1088 | 1400 | 30 | 48.7 | 20,322 |
| 1C | 1632 | 1400 | 30 | 72.4 | 20,726 |
| 1D | 0    | 1400 | 30 | 72.5 | 16,351 |
| 1A | 544  | 1500 | 30 | 40.0 | 16,979 |
| 1B | 1088 | 1500 | 30 | 35.9 | 17,788 |
| 1C | 1632 | 1500 | 30 | 49.3 | 18,251 |
| 1D | 0    | 1500 | 30 | 58.1 | 15,317 |
| 1A | 544  | 1600 | 30 | 35.1 | 14,430 |
| 1B | 1088 | 1600 | 30 | 30.1 | 15,866 |
| 1C | 1632 | 1600 | 30 | 21.5 | 15,836 |
| 1D | 0    | 1600 | 30 | 26.1 | 12,645 |
| 1A | 544  | 1700 | 30 | 14.9 | 9,354 |
| 1B | 1088 | 1700 | 30 | 14.7 | 9,492 |
| 1C | 1632 | 1700 | 30 | 17.3 | 9,846 |
| 1D | 0    | 1700 | 30 | 14.3 | 9,064 |

EXAMPLE 2

In Example 2, the effects of an addition of potassium thiocyanate (KCNS) to a sodium-reduced tantalum powder are compared to the effects of an addition of ammonium thiocyanate (NH4CNS). Also, the effect of ammonium mono-hydrogen orthophosphate (NH4)2HPO4 additions, along with either a KCNS or NH4CNS addition, is shown.

Figure 3:
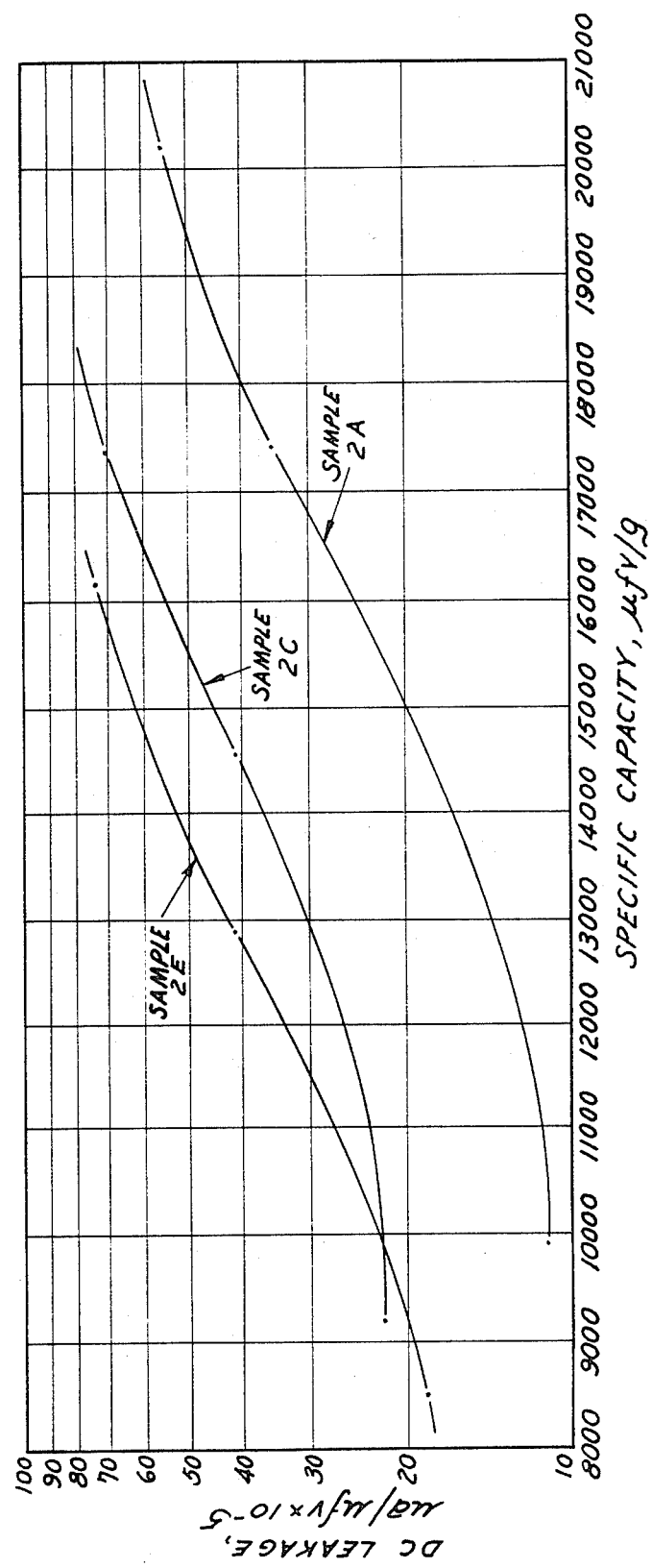
FIG. 3 is a graph of specific charge or capacity versus DC leakage per unit charge for anodes produced from tantalum powders containing a specific C+N+S content using different thiocyanate additives.

A different lot of sodium-reduced tantalum powder was used in Example 2 than for that used in Example 1. A 100 g sample of the powder was doped with an addition of KCNS to the 1632 ppm total C+N+S level by the procedure described in Example 1. This sample was designated 2A. Another sample similarly doped with KCNS was further doped with an essentially saturated solution of (NH4)2HPO4 to 50 ppm contained phosphorus based on elemental phosphorus. This sample was designated 2B. An additional sample 2C was similarly doped with an essentially saturated solution of NH4CNS to the 1632 total ppm C+N+S level. A further sample 2D was doped with NH4CNS (as for 2C) to the 1632 total ppm C+N+S level and (NH4)2HPO4 to the 50 ppm phosphorus level. All doped powders were dried as in Example 1. An undoped sample 2E was used as a control. All powders were thermally agglomerated, pressed into anodes, sintered at 1500°, 1600° or 1700° C., and tested for electrical properties by the procedures described in Example 1. The results are summarized in Table II and in FIG. 3:

TABLE II

Effect of KCNS and NH4CNS Additions Without and With (NH4)2HPO4 Additions on the Electrical Properties of Anodes of Sintered Sodium-Reduced Tantalum Powder

| Sample No. | Thiocyanate Addition, ppm C + N + S | | (NH4)2HPO4 Addition, ppm P | Sintering Condition | | Electrical Properties | |
|---|---|---|---|---|---|---|---|
| | KCNS | NH4CNS | | Temp., °C. | Time, Min. | DCL, $10^5$ μa/ufv | Specific Capacity, μfv/g |
| 2A | 1632 | 0 | 0 | 1500 | 30 | 55.4 | 20,212 |
| 2B | 1632 | 0 | 50 | 1500 | 30 | 109.0 | 19,048 |
| 2C | 0 | 1632 | 0 | 1500 | 30 | 71.4 | 17,376 |
| 2D | 0 | 1632 | 50 | 1500 | 30 | 99.4 | 17,287 |
| 2E | 0 | 0 | 0 | 1500 | 30 | 73.1 | 16,140 |
| 2A | 1632 | 0 | 0 | 1600 | 30 | 35.1 | 17,374 |
| 2B | 1632 | 0 | 50 | 1600 | 30 | 35.8 | 16,933 |
| 2C | 0 | 1632 | 0 | 1600 | 30 | 41.3 | 14,536 |
| 2D | 0 | 1632 | 50 | 1600 | 30 | 52.8 | 13,609 |
| 2E | 0 | 0 | 0 | 1600 | 30 | 41.0 | 12,915 |
| 2A | 1632 | 0 | 0 | 1700 | 30 | 11.1 | 9,893 |
| 2B | 1632 | 0 | 50 | 1700 | 30 | 16.6 | 9,980 |
| 2C | 0 | 1632 | 0 | 1700 | 30 | 21.8 | 9,173 |
| 2D | 0 | 1632 | 50 | 1700 | 30 | 27.0 | 9,584 |
| 2E | 0 | 0 | 0 | 1700 | 30 | 18.3 | 8,500 |

EXAMPLE 3

In Example 3, the effects of various amounts of an addition of KCNS or NH4CNS are considered in combination with a fixed addition of (NH4)2HPO4 on the electrical properties of anodes produced from a sodium-reduced tantalum powder.

The same lot of sodium-reduced tantalum powder was used in these tests as in Example 2. Contained C+N+S levels of 544, 1088 and 1632 ppm were added to the tantalum powder using an essentially saturated solution of either KCNS (samples 3A, 3B, and 3C) or NH4CNS (samples 3D, 3E, and 3F). In addition, a supplemental addition of 50 ppm phosphorus was made to each sample by adding essentially a saturated solution of (NH4)2HPO4. One control sample, containing an (NH4)2HPO4 addition of 50 ppm phosphorus but no addition of either KCNS or NH4CNS, was designated sample 3G. The doped samples were dried as in Example 1, and all samples were agglomerated, pressed to anodes, sintered for 30 minutes at 1400°, 1500°, 1600°, 1700° or 1800° C., and tested for electrical properties. For those groups of anodes sintered for 30 minutes at temperatures ranging from 1400° to 1700° C., the anodes were anodized at 100 volts and tested for DCL at 70 volts, as in Example 1. The groups of anodes sintered 30 minutes at 1800° C. were anodized at 200 volts and tested for DCL at 140 volts. The data are summarized in Table III.

TABLE III

Effect of Various Amounts of Either KCNS or NH4CNS and a Fixed (NH4)2HPO4 Addition on the Electrical Properties of Anodes Sintered from a Sodium-Reduced Tantalum Powder

| Sample No. | Thiocyanate Addition, ppm C + N + S | | (NH4)2HPO4 Addition, ppm P | Sintering Condition | | Electrical Properties* | |
|---|---|---|---|---|---|---|---|
| | KCNS | NH4CNS | | Temp., °C. | Time, Min. | DCL, $10^5$ μa/ufv | Specific Capacity, μfv/g |
| 3A | 544 | 0 | 50 | 1400 | 30 | 261.1 | 20,009 |
| 3B | 1088 | 0 | 50 | 1400 | 30 | 168.7 | 20,681 |
| 3C | 1632 | 0 | 50 | 1400 | 30 | 199.7 | 20,159 |
| 3D | 0 | 544 | 50 | 1400 | 30 | 135.1 | 18,343 |
| 3E | 0 | 1088 | 50 | 1400 | 30 | 139.8 | 19,635 |
| 3F | 0 | 1632 | 50 | 1400 | 30 | 149.0 | 19,802 |
| 3G | 0 | 0 | 50 | 1400 | 30 | 302.3 | 18,717 |
| 3A | 544 | 0 | 50 | 1500 | 30 | 124.0 | 17,982 |
| 3B | 1088 | 0 | 50 | 1500 | 30 | 93.1 | 19,119 |
| 3C | 1632 | 0 | 50 | 1500 | 30 | 109.0 | 19,042 |
| 3D | 0 | 544 | 50 | 1500 | 30 | 131.0 | 16,190 |
| 3E | 0 | 1088 | 50 | 1500 | 30 | 91.5 | 17,655 |
| 3F | 0 | 1632 | 50 | 1500 | 30 | 99.4 | 17,287 |
| 3G | 0 | 0 | 50 | 1500 | 30 | 141.8 | 16,035 |
| 3A | 544 | 0 | 50 | 1600 | 30 | 53.6 | 14,746 |
| 3B | 1088 | 0 | 50 | 1600 | 30 | 43.5 | 16,315 |
| 3C | 1632 | 0 | 50 | 1600 | 30 | 35.8 | 16,933 |
| 3D | 0 | 544 | 50 | 1600 | 30 | 44.0 | 13,081 |
| 3E | 0 | 1088 | 50 | 1600 | 30 | 52.4 | 13,916 |
| 3F | 0 | 1632 | 50 | 1600 | 30 | 52.8 | 13,609 |
| 3G | 0 | 0 | 50 | 1600 | 30 | 42.4 | 12,776 |
| 3A | 544 | 0 | 50 | 1700 | 30 | 17.6 | 9,417 |
| 3B | 1088 | 0 | 50 | 1700 | 30 | 17.2 | 9,872 |
| 3C | 1632 | 0 | 50 | 1700 | 30 | 16.6 | 9,980 |
| 3D | 0 | 544 | 50 | 1700 | 30 | 25.6 | 9,308 |
| 3E | 0 | 1038 | 50 | 1700 | 30 | 25.5 | 9,641 |

TABLE III-continued

Effect of Various Amounts of Either KCNS or NH4CNS
and a Fixed (NH4)2HPO4 Addition on the Electrical
Properties of Anodes Sintered from a Sodium-Reduced
Tantalum Powder

| Sample No. | Thiocyanate Addition, ppm C + N + S | | (NH4)2HPO4 Addition, ppm P | Sintering Condition | | Electrical Properties* | |
|---|---|---|---|---|---|---|---|
| | KCNS | NH4CNS | | Temp., °C. | Time, Min. | DCL $10^5$ μa/ufv | Specific Capacity, μfv/g |
| 3F | 0 | 1632 | 50 | 1700 | 30 | 25.6 | 9,584 |
| 3G | 0 | 0 | 50 | 1700 | 30 | 20.6 | 9,098 |
| 3A | 544 | 0 | 50 | 1800 | 30 | 92.3 | 6,069 |
| 3B | 1088 | 0 | 50 | 1800 | 30 | 85.3 | 6,042 |
| 3C | 1632 | 0 | 50 | 1800 | 30 | 88.1 | 5,449 |
| 3D | 0 | 544 | 50 | 1800 | 30 | 71.0 | 6,123 |
| 3E | 0 | 1038 | 50 | 1800 | 30 | 62.3 | 6,167 |
| 3F | 0 | 1632 | 50 | 1800 | 30 | 68.8 | 6,176 |
| 3G | 0 | 0 | 50 | 1800 | 30 | 56.0 | 6,114 |

*For 1400, 1500, 1600, and 1700° C. sintering conditions, anodes were anodized at 100 volts and tested at 70 volts; for 1800° C. sintering condition, anodes were anodized at 200 volts and tested at 140 volts.

EXAMPLE 4

Example 4 shows the effects of additions of varying amounts of KCNS and NH4CNS in combination with an addition of (NH4)2HPO4 to a tantalum powder prepared from an ingot.

A hydrided, high purity electron-beam melted tantalum ingot was milled and crushed to a FSSS of 3.1 μm (Fisher sub-sieve size in accordance with ASTM designation B330-65, "Standard Method of Test for Average Particle Size of Refractory metals and Compounds by the Fisher Sub-sieve Sizer"). An addition of an essentially saturated solution of KCNS was made to an amount of 181 ppm contained C+N+S to one portion of the tantalum hydride. A further addition of (NH4)2HPO4 essentially saturated solution was made to an amount of 25 ppm contained phosphorus to the same portion. This portion is designated sample 4A. Similarly, additions of KCNS to provide 453 ppm added C+N+S and 25 ppm phosphorus added as (NH4)2HPO4 were made to obtain sample 4B. And, similarly, sample 4C was prepared using KCNS to provide 906 ppm contained C+N+S and (NH4)2HPO4 to provide 25 ppm contained phosphorus. In a like manner, essentially saturated solutions of NH4CNS and (NH4)2HPO4 were used to provide additions of 181 ppm contained C+N+S and 25 ppm contained phosphorus in sample 4D, 453 ppm C+N+S and 25 ppm P in sample 4E, and 906 ppm C+N+S and 25 ppm P in sample 4F. An additional sample 4G was prepared which contained only an addition of 25 ppm contained P added as (NH4)2HPO4.

These doped samples were thermally agglomerated according to the process of U.S. Pat. No. 4,141,719, which patent is assigned to the assignee and incorporated herein by reference. The hydride was heated in a chemically non-reactive environment to remove the hydrogen, further heated to 1390° C. for 30 minutes in a chemically non-reactive environment to produce a porous sintered cake, which was then reduced into aggregates less than 200 mesh. The −200 mesh aggregates were heated 30 minutes at 1490° C. in a chemically non-reactive environment. The resulting porous cake was reduced into aggregates less than 35 mesh, and the final −35 mesh powders were blended.

One-gram anodes as described in Example 1 were pressed to a green density of 7.2 g/cm³ with an embedded tantalum lead wire. One group of anodes of each powder portion was vacuum sintered for 30 minutes at 1600° C. (optical temperature), another group was sintered 30 minutes at 1700° C., and another group was sintered for 30 minutes at 2000° C. The electrical testing procedure for the anodes is described in Example 1. Those anodes sintered at 1600° C. and at 1700° C. were anodized at 100 volts and tested for direct current leakage at 70 volts. The anodes sintered at 2000° C. were anodized at 270 volts and tested for DCL at 240 volts.

The average values for DCL per unit charge and specific capacity (μfv/g) for the various groups of anodes are summarized in Table IV.

TABLE IV

Effect of Various Amounts of Either KCNS or NH4CNS
and a fixed (NH4)2HPO4 Addition on the Electrical
Properties of Anodes of Tantalum Powder Prepared
from an Electron-Beam Melted Ingot

| Sample No. | Thiocyanate Addition, ppm C + N + S | | (NH4)2HPO4 Addition, ppm P | Sintering Condition | | Electrical Properties | |
|---|---|---|---|---|---|---|---|
| | KCNS | NH4CNS | | Temp., °C. | Time, Min. | DCL, $10^5$ μa/ufv | Specific Capacity, μfv/g |
| 4A | 181 | 0 | 25 | 1600 | 30 | 25.3 | 7,908 |
| 4B | 453 | 0 | 25 | 1600 | 30 | 22.9 | 8,312 |
| 4C | 906 | 0 | 25 | 1600 | 30 | 26.5 | 8,687 |
| 4D | 0 | 181 | 25 | 1600 | 30 | 25.3 | 7,105 |
| 4E | 0 | 453 | 25 | 1600 | 30 | 23.7 | 8,005 |
| 4F | 0 | 906 | 25 | 1600 | 30 | 19.3 | 8,288 |
| 4G | 0 | 0 | 25 | 1600 | 30 | 22.9 | 7,153 |
| 4A | 181 | 0 | 25 | 1700 | 30 | 15.2 | 6,564 |
| 4B | 453 | 0 | 25 | 1700 | 30 | 17.5 | 6,864 |
| 4C | 906 | 0 | 25 | 1700 | 30 | 19.6 | 7,155 |
| 4D | 0 | 181 | 25 | 1700 | 30 | 16.5 | 6,046 |

TABLE IV-continued

Effect of Various Amounts of Either KCNS or NH₄CNS and a fixed (NH₄)₂HPO₄ Addition on the Electrical Properties of Anodes of Tantalum Powder Prepared from an Electron-Beam Melted Ingot

| Sample No. | Thiocyanate Addition, ppm $C + N + S$ KCNS | NH$_4$CNS | (NH$_4$)$_2$HPO$_4$ Addition, ppm P | Sintering Condition Temp., °C. | Time, Min. | Electrical Properties DCL, $10^5$ μa/ufv | Specific Capacity, μfv/g |
|---|---|---|---|---|---|---|---|
| 4E | 0 | 453 | 25 | 1700 | 30 | 14.9 | 6,700 |
| 4F | 0 | 906 | 25 | 1700 | 30 | 13.6 | 6,632 |
| 4G | 0 | 0 | 25 | 1700 | 30 | 15.5 | 6,184 |
| 4A | 181 | 0 | 25 | 2000 | 30 | 13.6 | 2,407 |
| 4B | 453 | 0 | 25 | 2000 | 30 | 14.3 | 3,091 |
| 4C | 906 | 0 | 25 | 2000 | 30 | 13.6 | 3,127 |
| 4D | 0 | 181 | 25 | 2000 | 30 | 13.6 | 3,379 |
| 4E | 0 | 453 | 25 | 2000 | 30 | 13.6 | 3,339 |
| 4F | 0 | 906 | 25 | 2000 | 30 | 13.6 | 3,225 |
| 4G | 0 | 0 | 25 | 2000 | 30 | 11.2 | 3,354 |

EXAMPLE 5

Example 5 compares the effects of individual additions of the elements carbon, nitrogen and sulfur with their combined effect on electrical properties of anodes sintered from a sodium-reduced tantalum powder.

One sample 5A of the tantalum powder was heated in a vacuum of about $10^{-5}$ torr absolute pressure to about 1325° C. (optical temperature), held for one-half hour at temperature, and then cooled under vacuum to about 700° C. The furnace vacuum pumps were valved off and a quantity of hydrogen sulfide gas in an amount to bring the pressure to 98.8 torr was introduced and allowed to react with and be absorbed by the tantalum powder. Then the powder was cooled to ambient temperature. The resulting powder was milled and screened to obtain −35 mesh agglomerated powder. The powder analyzed 5600 ppm sulfur. Anodes were pressed from this powder; some of these were tested for DCL and specific capacity by the procedures described in Example 1. Another sample 5B of the tantalum powder was similarly processed as described for sample 5A, except that after cooling the furnace under vacuum to 700° C., and after valving off the vacuum pumps, the furnace pressure was quickly elevated to 83.6 torr by introducing a quantity of methane gas, which then was allowed to be absorbed by the tantalum powder. This sample 5B analyzed 404 ppm carbon. An additional sample 5C was similarly processed, except that it was treated at 750° with nitrogen gas at 2.0 torr. This sample 5C analyzed 75 ppm nitrogen. A fourth sample (5D) was prepared by blending portions of samples 5A, 5B and 5C powders to obtain a powder that analyzed 247 ppm carbon, 66 ppm nitrogen, and 1260 ppm sulfur.

Anodes were pressed from these powders (5B, 5C, and 5D), sintered and tested as described for sample 5A. The average values for DCL and specific capacity for the various groups of anodes are summarized in Table V and in FIG. 4.

TABLE V

EFFECT OF INDIVIDUAL AND COMBINED CARBON, NITROGEN AND SULFUR ADDITIONS ON THE ELECTRICAL PROPERTIES OF SINTERED ANODES OF SODIUM-REDUCED TANTALUM POWDER

| Sample No. | Addition, ppm C | N | S | Sintering Condition Temp., °C. | Time, Min. | Electrical Properties DCL, $10^5$ μa/ufv | Specific Capacity, ufv/g |
|---|---|---|---|---|---|---|---|
| 5A | 0 | 0 | 5600 | 1600 | 30 | 43.9 | 15,806 |
| 5B | 404 | 0 | 0 | 1600 | 30 | 25.7 | 12,765 |
| 5C | 0 | 75 | 0 | 1600 | 30 | 32.6 | 12,406 |
| 5D | 247 | 66 | 1260 | 1600 | 30 | 19.2 | 16,574 |
| 5A | 0 | 0 | 5600 | 1700 | 30 | 23.9 | 4,574 |
| 5B | 404 | 0 | 0 | 1700 | 30 | 15.4 | 8,486 |
| 5C | 0 | 75 | 0 | 1700 | 30 | 7.7 | 8,468 |
| 5D | 247 | 66 | 1260 | 1700 | 30 | 13.0 | 10,620 |

EXAMPLE 6

Example 6 compares the effects of combined additions of: carbon plus sulfur (C+S), carbon plus nitrogen (C+N), and carbon plus nitrogen plus sulfur (C+N+S) on the electrical properties of anodes pressed and sintered from sodium-reduced tantalum powder.

These additions were made using selected heterocyclic and other organic compounds that contained the desired additive elements in their chemical composition. The specific chemical compounds and their formulae were:

| Organic Compound | Chemical Formula | Desired Contained Additive Elements |
|---|---|---|
| Pyrazole | $C_3H_4N_2$ | C, N |
| Thiophene | $C_4H_4S$ | C, S |
| Thiourea | $CH_4N_2S$ | C, N, S |
| Thiocarbanilide (or diphenyl thiourea) | $C_{13}H_{12}N_2S$ | C, N, S |

A 100 g portion, designated sample 6A, of sodium-reduced tantalum powder was doped with 0.1907 g pyrazole dissolved in 50 ml deionized water. Another 100 g portion, sample 6B, was doped with 0.25 ml thiophene dispersed in 50 ml deionized water. A 100 g portion, sample 6C, was doped with 0.2137 g thiourea dissolved in 50 ml deionized water. A 100 g portion, sample 6D, was doped with a dispersion of 0.6412 g thiocarbanilide in 50 ml in water. These doped powders were dried for 16 hours at 70° C. Then the powders were thermally agglomerated at 1325° C. for one-half hour and subsequently milled and screened to −35 mesh. The retained concentrations of additives in these doped powders are shown in Table VI. Anodes were then pressed from these powders. Some anodes were sintered for 30 minutes at 1600° C. and others for 30 minutes at 1700° C., then tested by the procedures described in Example 1. The average values for DCL per unit charge and specific capacity for the various groups of anodes are summarized in Table VI and in FIG. 5.

data on DCL and specific capacity from Table II are plotted for the C+N+S-containing powders (samples 2A and 2C) compared to the undoped control powder (sample 2E). A further observation from Table II is that a supplementary addition of phosphorus, added as $(NH_4)_2HPO_4$ in this example, enhances the improvement in specific capacity provided by the C+N+S additives at the 1700° C. sintering condition.

The data summarized in Table III shows that increases in the amount of C+N+S-containing additive, along with a fixed phosphorous additive, result in a

TABLE VI

EFFECT OF VARIOUS COMBINED CARBON, NITROGEN AND SULFUR ADDITIONS ON THE ELECTRICAL PROPERTIES OF SINTERED ANODES OF SODIUM-REDUCED TANTALUM POWDER

| Sample No. | Organic Compound Additive | Retained Addition, ppm | | | Sintering Condition | | Electrical Properties | |
|---|---|---|---|---|---|---|---|---|
| | | C | N | S | Temp., °C. | Time, Min. | DCL, $10^5$ $\mu a/ufv$ | Specific Capacity, $\mu fv/g$ |
| 6A | Pyrazole | 152 | 91 | 0 | 1600 | 30 | 18.0 | 11,587 |
| 6B | Thiophene | 74 | 0 | 30 | 1600 | 30 | 25.9 | 11,719 |
| 6C | Thiourea | 98 | 95 | 500 | 1600 | 30 | 12.9 | 13,988 |
| 6D | Thiocarbanilide | 200 | 104 | 600 | 1600 | 30 | 21.0 | 14,433 |
| 6A | Pyrazole | 152 | 91 | 0 | 1700 | 30 | 13.0 | 9,295 |
| 6B | Thiophene | 74 | 0 | 30 | 1700 | 30 | 14.0 | 9,333 |
| 6C | Thiourea | 98 | 95 | 500 | 1700 | 30 | 12.9 | 10,122 |
| 6D | Thiocarbanilide | 200 | 104 | 600 | 1700 | 30 | 12.5 | 10,427 |

Discussion

FIG. 1 shows a plot of specific capacity as a function of sintering temperature from data in Table I for the anodes made from tantalum powders containing various amounts of KCNS additive. Increasing amounts of such C+N+S-containing additive progressively increased specific capacity over the entire range of sintering temperatures.

FIG. 2 is a plot of the direct current leakage per unit charge versus specific capacity values from Table I for anodes (sample 1C) made from the powder to which 1632 ppm contain C+N+S was added as KCNS, and also from the undoped control powder (sample 1D). The improvement of the invention can be illustrated two ways:

(1) Using a DCL value of $25 \times 10^{-5}$ $\mu a/\mu fv$ as a limit in FIG. 2, the control powder (sample 1D) could be sintered at a selected temperature and time to a maximum specific capacity of about 12,400 $\mu fv/g$, as shown in the plot. At this same value of DCL, the powder with the addition of 1632 ppm contained C+N+S (sample 1C) could be sintered to a maximum specific capacity of about 16,700 $\mu fv/g$, representing a 35% increase in specific capacity over the undoped control.

(2) Referring again to FIG. 2, assume it is desired to produce sintered anodes having a specific capacity of 16,000 $\mu fv/g$. When sintered to achieve this value, the anodes produced from the control powder (sample 1D) would have a DCL of about $67 \times 10^{-5}$ $\mu a/\mu fv$. The anodes produced from tantalum powder with the addition of 1632 ppm contained C+N+S (sample 1C) would have a DCL of about $22 \times 10^{-5}$ $\mu a/\mu fv$, or a 67% decrease in DCL compared to the undoped control.

Inspection of Table II shows that C+N+S additions to tantalum powder, made either as KCNS or $NH_4CNS$, provide substantial improvements in specific capacity for all sintering conditions investigated. KCNS appears preferred in this example compared to $NH_4CNS$. This is further shown in FIG. 3 in which the progressive increase in specific capacity. This occurs with either the KCNS or $NH_4CNS$ additive at sintering temperatures of 1400° to about 1700° C. In this sintering range, KCNS appears to be the preferred additive. However, at the 1800° C. sintering temperature, $NH_4CNS$ appears to be preferred, although the phosphorous additive alone may, in fact, now provide a better combination of DCL and specific capacity.

Similar improvements in specific capacity were obtained by C+N+S plus phosphorous additives to powder prepared from an electron-beam melted tantalum ingot, as shown in Table IV. Here KCNS appeared as the preferred C+N+S additive at sintering temperatures of 1600° and 1700° C. At the 200° C. sintering condition, $NH_4CNS$ appears to be the preferred CNS-containing additive, although the phosphorous-containing additive alone gives similar results.

Figure 4:
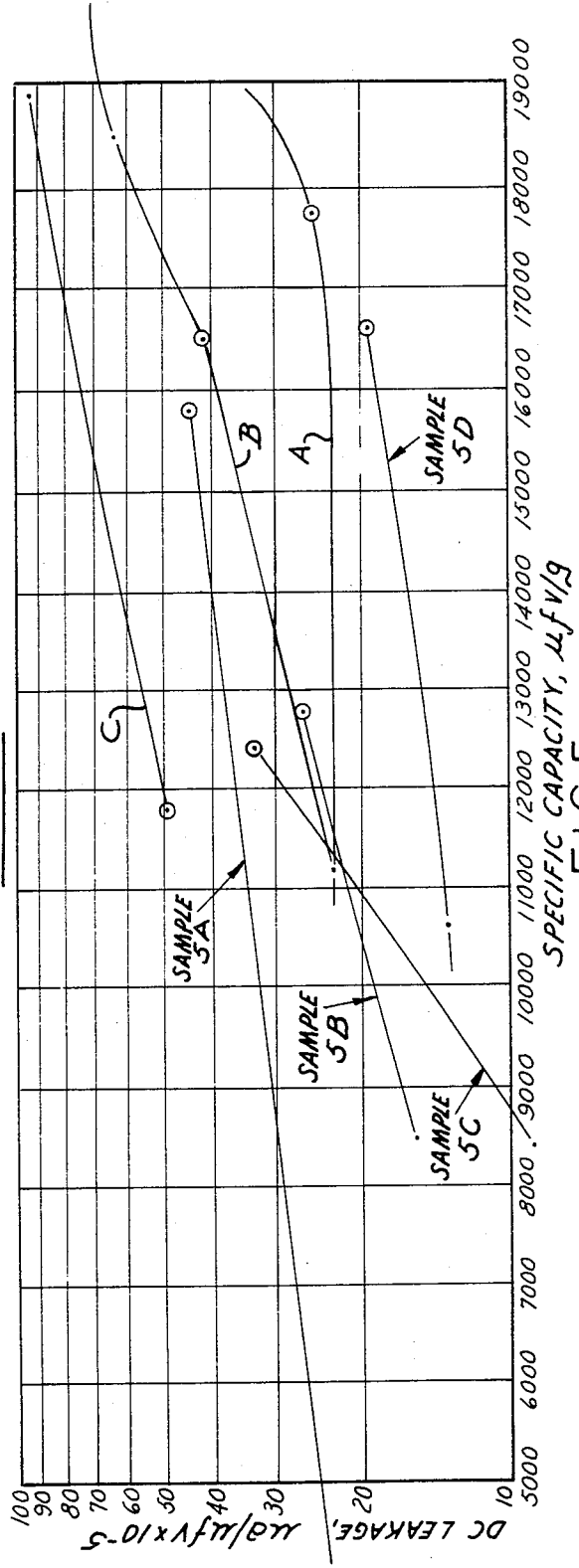
FIGS. 4 and 5 are graphs of DC leakage per unit charge versus specific charge or capacity for anodes produced from tantalum powder doped with various combinations of carbon, nitrogen and sulfur additions.

The electrical data in Table V is plotted in FIG. 4. A curve C for a similar powder with no addition of carbon, nitrogen or sulfur is shown. Also illustrated for purpose of comparison are data for similar powder doped with 1262 ppm C+N+S added as KCNS (curve B), and another similar powder doped with 1632 ppm C+N+S added as KCNS (curve A). Several observations and conclusions can be drawn. The individual C or N or S additions provide improvement in electrical properties (higher specific capacity or lower DCL per unit charge, or a combination of these) over at least a portion of the sintering range compared to the undoped control. The addition of sulfur alone favors higher specific capacity than do the C or N additives for sintering at 1600° C., but suffered a severe loss at 1700° C. sintering. The C and N additives at both sintering temperatures, especially the N additive at 1700° C., improved (lowered) DCL per unit charge.

However, the combination of all three elements—C, N, and S—gave the best combined results of high specific capacity accompanied by lower DC leakage per unit charge than either the individually doped powders or the undoped powders. Among those C+N+S doped materials shown are powders doped with two levels of KCNS and one powder doped by gaseous additions. Specifically, these powders contained additions of:

| Sample/ Curve | Additive Method | Additive Quantity, ppm C + N + S | Contained Contents ppm | | |
|---|---|---|---|---|---|
| | | | C | N | S |
| B | KCNS | 1269 | 262 | 306 | 701 |
| A | KCNS | 1632 | 337 | 394 | 901 |
| 5D | Gaseous | 1573 | 247 | 66 | 1260 |

As clearly shown in FIG. 4, these amounts of C+N+S additives, and the methods used for the additives, provide a substantial improvement in all cases compared to the undoped control. In these examples, the sulfur content, on a weight basis (i.e., tantalum metal weight basis), exceeds not only either the carbon content or the nitrogen content, but also the sum of the carbon content plus the nitrogen content.

Figure 5:
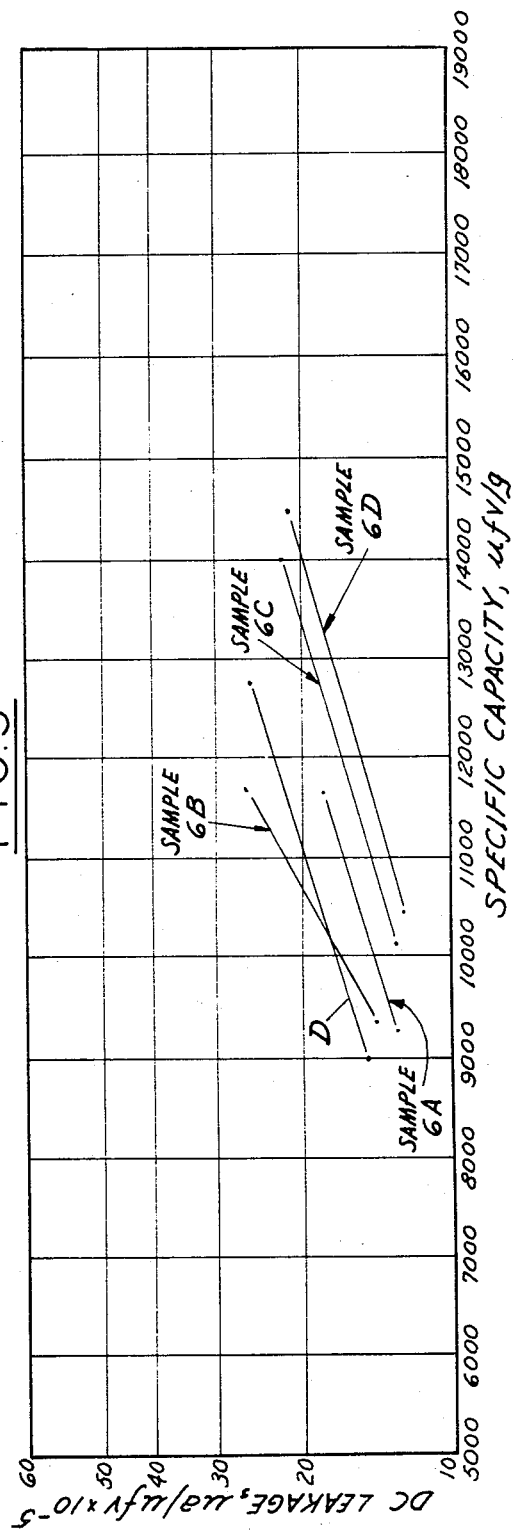

The electrical data in Table VI, which is plotted in FIG. 5 along with data for anodes sintered from a similar undoped power (curve D), show the effects of combined C+N, C+S, and C+N+S additives. The organic compounds used in making these combined additives are shown in Table VI. Compared to the undoped control powder, the C+S additive provided an improvement in specific capacity and DCL per unit charge at one sintering temperature (1700° C.). The C+N additive resulted in improved DCL at both sintering temperatures and had relatively slight effects of specific capacity. The C+N+S additives resulted in significantly higher specific capacity accompanied by lower DCL. Again, the maximum improvement in specific capacity in the carbon plus nitrogen plus sulfur experiment was obtained when the sulfur content exceeded the carbon and nitrogen contents, singly or in combination.

What is claimed is:

1. A tantalum powder for electrodes in elctrolytic capacitors with improved specific capacity and low direct current leakage containing a total added carbon plus nitrogen plus sulfur content in an amount from about 100 to 10,000 ppm total contained C+N+S, with a minimum sulfur content of 50 ppm on a tantalum metal weight basis.

2. A tantalum powder in accordance with claim 1 also containing an added phosphorous-containing material in an amount equivalent to about 2 to 400 ppm phosphorous on a tantalum metal weight basis in the final tantalum powder.

3. A tantalum powder in accordance with claim 1 wherein said added carbon, nitrogen and sulfur contents are about in an equal mole ratio.

4. A tantalum powder in accordance with claim 1 wherein said added carbon, nitrogen and sulfur contents have a sulfur content greater than either the carbon content or the nitrogen content on a tantalum metal weight basis.

5. A tantalum powder in accordance with claim 4 wherein said sulfur content is at least equal to the combined carbon and nitrogen contents on a tantalum metal weight basis.

6. A tantalum powder for electrodes in electrolytic capacitors with improved specific capacity and low direct current leakage containing a total added carbon plus nitrogen plus sulfur content in an amount from about 150 ppm to 3,000 ppm total contained C+N+S, with a minimum sulfur content of 75 ppm on a tantalum metal weight basis.

7. A tantalum powder for electrodes in electrolytic capacitors with improved specific capacity and low direct current leakage containing a total added carbon plus nitrogen plus sulfur content in an amount from about 181 to 1632 ppm contained C+N+S on a tantalum metal weight basis.

8. In a method of preparing a tantalum powder for electrodes in electrolytic capacitors with improved specific capacity and low direct current leakage, the improvement which comprises the step of adding to said powder a material containing at least two elements selected from the group consisting of carbon, nitrogen and sulfur in an amount from about 100 to 10,000 ppm total contained additive on a tantalum metal weight basis.

9. In a method of preparing a tantalum powder for electrodes in electrolytic capacitors with improved specific capacity and low direct current leakage, the improvement which comprises the step of adding to said powder a carbon plus nitrogen plus sulfur-containing material in an amount from about 181 to 1632 ppm total contained carbon plus nitrogen plus sulfur content on a tantalum metal weight basis.

10. In a method of preparing a tantalum powder for electrodes in electrolytic capacitors with improved specific capacity and low direct current leakage, the improvement which comprises the step of adding to said powder a carbon plus nitrogen plus sulfur-containing material in an amount from about 100 to 10,000 ppm total contained carbon plus nitrogen plus sulfur content, with a minimum sulfur content of 50 ppm on a tantalum metal weight basis.

11. The method in accordance with claim 10 wherein said total content is in the range of about 150 to 3000 ppm, and wherein said sulfur content is a minimum of 75 ppm on a tantalum metal weight basis.

12. A method in accordance with claim 10 comprising the additional step of adding to said powder a phosphorous-containing material in an amount equivalent to about 2 to 400 ppm elemental phosphorus on a tantalum metal weight basis in the final tantalum powder.

13. The method in accordance with claim 10 wherein said carbon, nitrogen and sulfur are added in equal mole ratios in said carbon plus nitrogen plus sulfur material.

14. The method in accordance with claim 13 wherein said carbon plus nitrogen plus sulfur-containing material is added in the form of an inorganic thiocyanate.

15. A method in accordance with claim 14 wherein said inorganic thiocyanate is selected from the group consisting of potassium thiocyanate and ammonium thiocyanate.

16. A method in accordance with claim 10 wherein said carbon plus nitrogen plus sulfur-containing material is added as a dry powder to said tantalum powder.

17. A method in accordance with claim 10 wherein said carbon plus nitrogen plus sulfur-containing material is dispersed or dissolved in an aqueous media, and wherein the resultant dispersion or solution is added to said tantalum powder.

18. In a method of preparing a tantalum powder for electrodes in electrolytic capacitors with improved specific capacity and low direct current leakage, the improvement which comprises the step of adding to said powder a carbon plus nitrogen plus sulfur-containing material in an amount from about 100 to 10,000 ppm total contained carbon plus nitrogen plus sulfur content, with a minimum sulfur content of 50 ppm on a tantalum metal weight basis, the said material being added to said tantalum powder by reacting said tantalum powder at elevated temperatures with hydrocarbon, nitrogen and sulfur-containing gases.

19. In a method of preparing a tantalum powder for electrodes in electrolytic capacitors with improved specific capacity and low direct current leakage, the improvement which comprises the step of adding to said powder carbon and sulfur-containing material in an amount from about 100 to 10,000 ppm total contained carbon plus sulfur content, with a minimum sulfur content of 50 ppm on a tantalum metal weight basis, the said material being added to said tantalum powders by reacting said tantalum powder at elevated temperatures with hydrocarbon and sulfur-containing gases.

20. In a method of preparing a tantalum powder for electrodes in electrolytic capacitors with improved specific capacity and low direct current leakage, the improvement which comprises the step of adding to said powder nitrogen plus sulfur-containing material in an amount from about 100 to 10,000 ppm total contained nitrogen plus sulfur content with a minimum sulfur content of 50 ppm on a tantalum metal weight basis, the said material being added to said tantalum powder by reacting said tantalum powder at elevated temperatures with nitrogen and sulfur-containing gases.

21. In a method of preparing a tantalum powder for electrodes in electrolytic capacity with improved specific capacity and low direct current leakage, the improvement which comprises the step of adding to said powder a carbon plus nitrogen-containing material in an amount from about 100 to 10,000 ppm total contained carbon plus nitrogen content, the said material being added to said tantalum powder by reacting said tantalum powder at elevated temperatures with hydrocarbon and nitrogen gases.

22. A method in accordance with claim 9 wherein the said carbon plus nitrogen plus sulfur-containing material is in the form of an organic compound containing nitrogen and sulfur, or a combination of an organic compound containing nitrogen with an organic compound containing sulfur.

23. A tantalum powder for electrodes in electrolytic capacitors with improved specific capacity and low direct current leakage containing additives of at least two selected from the group consisting of carbon, nitrogen and sulfur in an amount from about 100 to 10,000 ppm total additives.

24. The tantalum powder in accordance with claim 23 wherein one of said additives is sulfur in the amount of at least 50 ppm on a tantalum weight basis.

25. A tantalum powder in accordance with claim 23 also containing an added phosphorous-containing material in an amount equivalent to about 2 to 400 ppm phosphorous on a tantalum metal weight basis in the final tantalum powder.

* * * * *